A. T. HAGEN & D. M. COOPER.
G. B. CAUDLE, EXECUTOR OF D. M. COOPER, DEC'D.
IRONING MACHINE.
APPLICATION FILED AUG. 12, 1914.
1,201,040.
Patented Oct. 10, 1916.
4 SHEETS—SHEET 2.
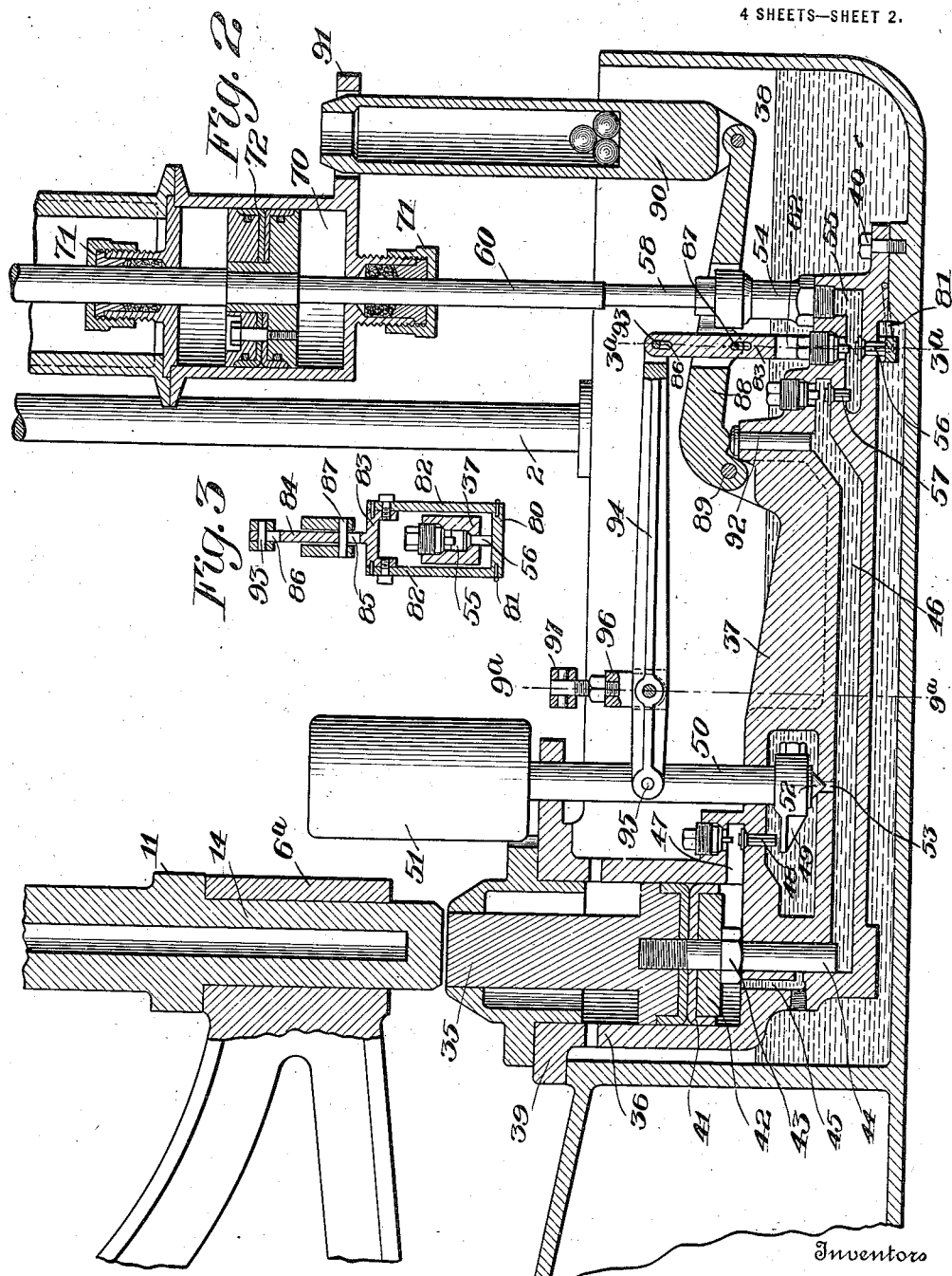
Witnesses
H. E. Stonebraker
Nelson H. Copp
Inventors
Arthur T. Hagen + George B. Caudle,
executor of estate of Daniel M. Cooper
deceased.
By Church & Church
their Attorneys

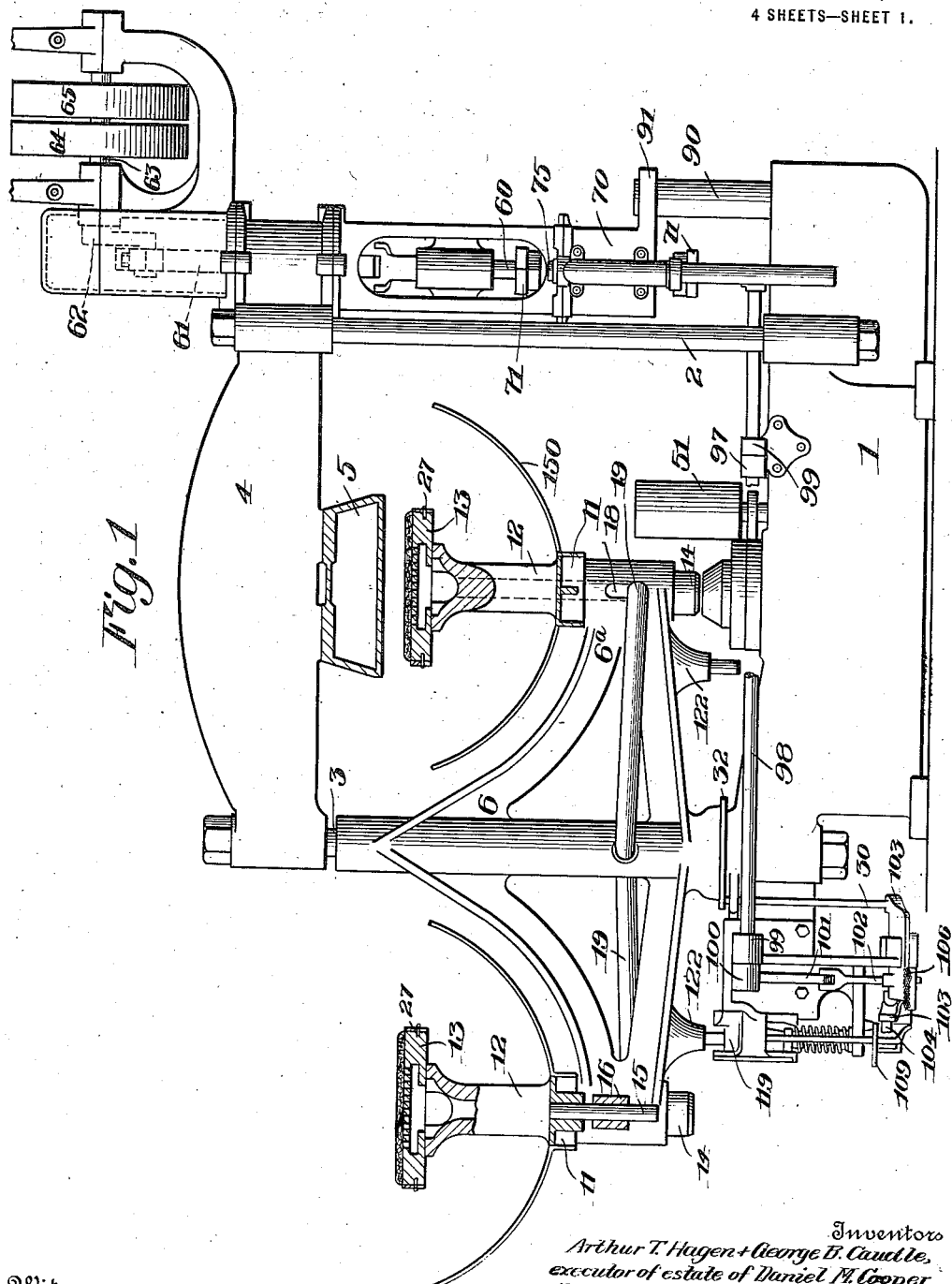

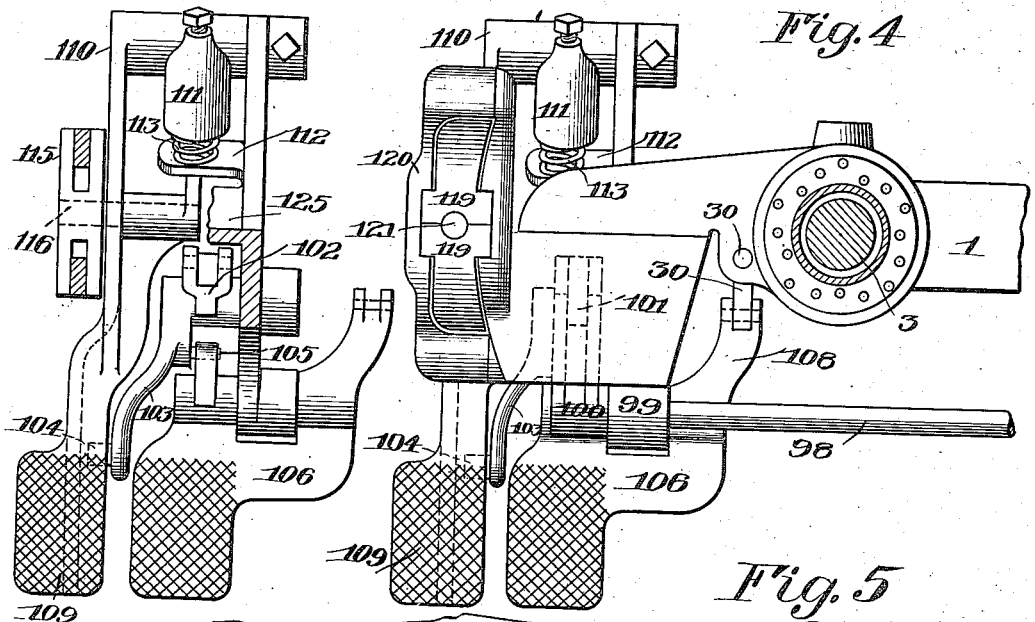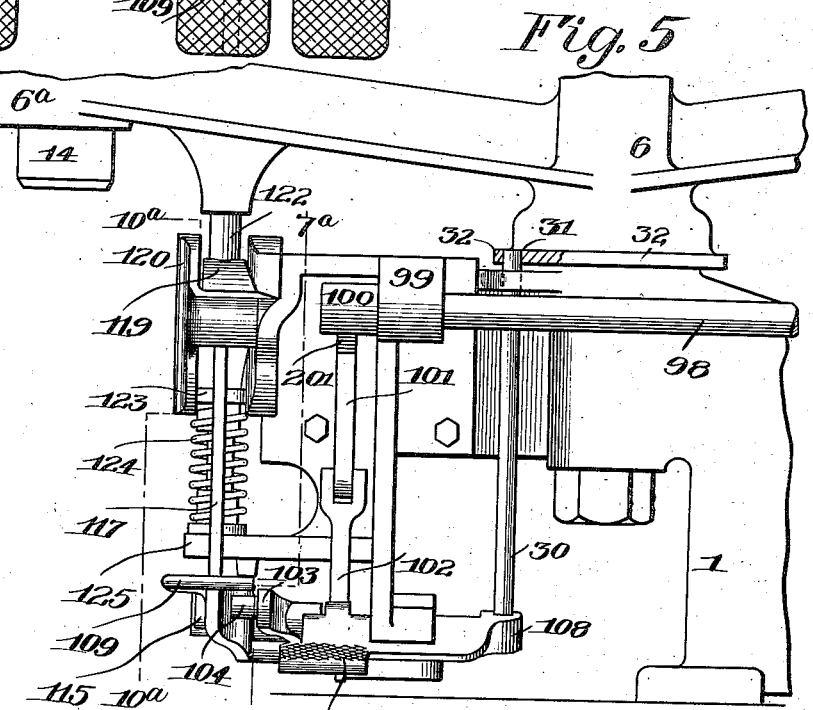

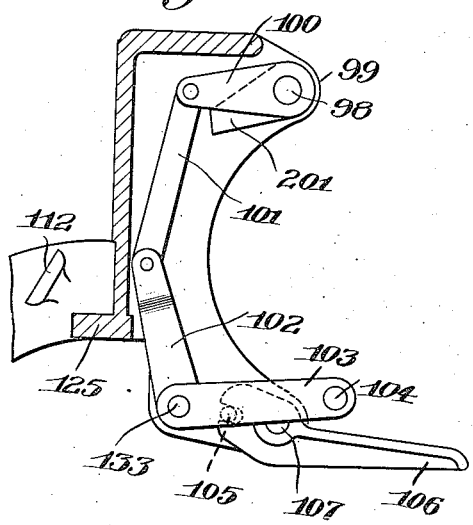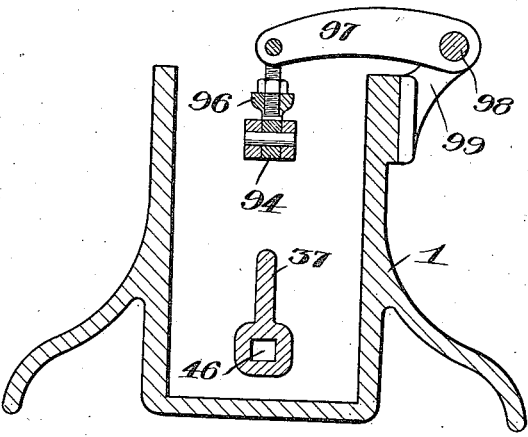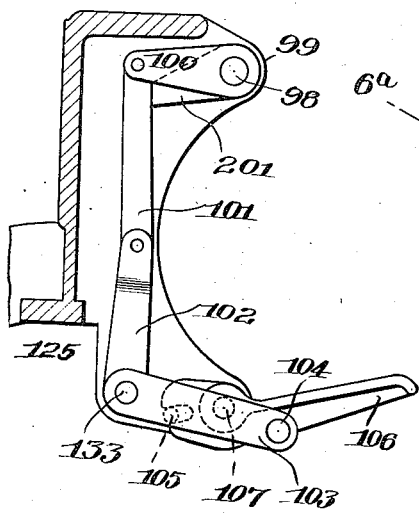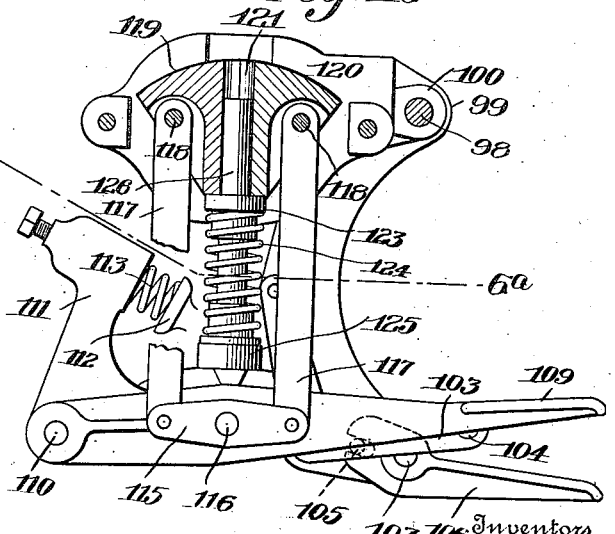

UNITED STATES PATENT OFFICE.

ARTHUR T. HAGEN, OF ROCHESTER, AND DANIEL M. COOPER, DECEASED, LATE OF ROCHESTER, NEW YORK, BY GEORGE B. CAUDLE, EXECUTOR, OF ROCHESTER, NEW YORK, ASSIGNORS TO AMERICAN LAUNDRY MACHINERY COMPANY, OF CINCINNATI, OHIO, A CORPORATION OF OHIO.

IRONING-MACHINE.

1,201,040. Specification of Letters Patent. Patented Oct. 10, 1916.

Original application filed September 15, 1905, Serial No. 278,624. Divided and this application filed August 12, 1914. Serial No. 856,367.

*To all whom it may concern:*

Be it known that ARTHUR T. HAGEN, of Rochester, in the county of Monroe, State of New York, and DANIEL M. COOPER, deceased, were the inventors of certain new and useful Improvements in Ironing-Machines; and we, ARTHUR T. HAGEN and GEORGE B. CAUDLE, executor of the estate of DANIEL M. COOPER, deceased, late of Rochester, in the county of Monroe and State of New York, hereby declare the following to be a full, clear, and exact description of the same, reference being had to the accompanying drawings, forming a part of this specification, and to the reference-numerals marked thereon.

The present invention relates to laundry machinery and has for its object to provide an improved apparatus for pressing or ironing shirt bosoms of that class embodying a work support or ironing table and a heated platen or ironing surface, which are relatively movable to bring the iron and garment in contact for any desired length of time, and it has for its further object to provide an improved machine embodying a plurality of work supports adapted to be brought into alinement with the iron and means for operating and controlling the parts whereby the pressing operation is accomplished in the best manner, and the various operating parts are easily controlled and actuated.

The invention has for its further object to provide in a machine of this character an improved form of hydraulic elevating mechanism for operating the work support, together with controlling devices which coöperate with the work supports for governing its operation.

To these and other ends the invention consists in certain improvements and combinations of parts all as will be hereinafter more fully described, the novel features being pointed out in the claims at the end of the specification.

In the drawings: Figure 1 is a front view of a machine embodying the invention. Fig. 2 is a vertical sectional view of the lower portion of the machine showing the hydraulic operating mechanism. Fig. 3 is a sectional view on the line 3ª—3ª of Fig. 2. Fig. 4 is a plan view of the operating and controlling treadles. Fig. 5 is a front elevation of the same. Fig. 6 is a horizontal sectional view on the line 6ª—6ª of Fig. 10. Fig. 7 is a vertical sectional view on the line 7ª—7ª of Fig. 5 with the parts shown in the position when the plunger is being operated. Fig. 8 is a similar view showing the position of the parts when the machine is at rest. Fig. 9 is a sectional view on the line 9ª—9ª of Fig. 2. Fig. 10 is a sectional view on the line 10ª—10ª of Fig. 5.

Similar reference numerals in the several figures indicate the same parts.

The main frame of the machine embodies in the present construction, a base frame or casting indicated by 1, from one end of which extend the vertical standards 2 (two in the present instance) and from the other end extends a standard 3, said standards being connected at their upper ends to a yoke or cross beam 4 to the under side of which is bolted or otherwise secured, a steam chest or chamber 5, the lower surface of which is smoothed and polished to form the iron or platen with which the articles are brought in contact.

6 indicates a frame or carrier sleeved upon the standard 3 and capable of rotation thereon. This carrier frame is provided with a plurality of radially-extending arms 6ª (two in the present instance) each carrying at its outer end a vertically movable ironing board or work support, embodying a lower plate 11, a narrow standard 12 and an upper plate 13. Secured to or formed upon the lower side of the bottom plate 11 is a guide or extension 14 vertically movable in a corresponding recess formed in the end of the arm 6ª of the carrier, the construction being such that the work support is permitted a vertical movement on the carrier, but is guided to move in right lines to permit the work to be brought in contact with the lower surface of the iron 5 and firmly pressed in contact therewith. The usual shield or guard 150 is also attached to the plate 11 to protect the garment from contact with the operating parts. The upper plate or bosom board 13 is hollow and its upper surface is provided with a plurality of small apertures or passages extending through it and connecting with the interior.

So far the description has been confined to one of the work supports or ironing tables located upon one of the arms 6ᵃ of the rotary carrier 6, but as both ironing tables are the same and each is permitted an independent vertical movement of the carrier arm when beneath the iron, the construction and manner of operation of the parts will be understood. The carrier is adapted to be rotated on the standard by hand and is locked in position with one of the bosom boards beneath the steam heated platen or iron by means hereinafter described.

The means employed for operating the ironing board and the work into contact with the heated platen 5, consists of a hydraulic piston or plunger 35 arranged beneath the heated platen and operating in a cylinder 36, forming part of a casting or frame 37, secured in the base of the machine, said base being provided with a recess or chamber 38 adapted to contain a quantity of liquid, such as oil, and the casting or frame 37 being provided with a flange 39 resting on the upper edge of this chamber and secured thereto by suitable bolts at that end, and at the other end being secured to the bottom of the frame by bolts as 40. The piston 35 is provided with suitable packing 41 secured in position by a plate 42, which latter is in turn held by a bolt 43 projecting beyond the end of the main piston and constituting a smaller piston fitting within a small cylinder 44 axially in line with the former. Formed within the casting 37 is a small passage 45 leading from the lower end of the larger cylinder into the side of the smaller cylinder 44 above its lower end, and the bottom of said cylinder 44 is in communication with a longitudinal passage 46 leading to the opposite end of the casting and communicating with the cylinder of a hydraulic force pump. Extending laterally from the main cylinder 36 is a passage 47 having a port opening into the chamber 38 closed by a downwardly closing valve 48, the stem of which is adapted to be engaged by an arm 49 secured to, or forming part of, a rod 50 to which is applied a heavy weight 51. The lower end of this rod is provided with a conical head 52 constituting a valve adapted to close, when in its lowermost position, a small passage 53 leading from the passage 46 into the oil chamber 38, this rod 50 and the valves operated thereby forming a releasing device for permitting the descent of the plunger 35, as will be described. The valve 48 is made separate from the rod 50 in order that it may have a slight independent movement to open the valve 52 prior to opening valve 48, but the weight controls the closing of the valve 48 because it must descend before the valve is permitted to close. The force pump for drawing the oil from the chamber 38 and forcing it into the passage 47 embodies a cylinder 54 secured to the casting 37 and in connection with the chamber 55 therein, 56 indicating the inlet check valve upwardly opening, and 57 the corresponding discharge valve between the chamber 55 and the passage 46, so that at each upward reciprocation of the pump plunger 58, the oil will be drawn through the passage controlled by the check valve 56 and discharged at each downward reciprocation through the passage controlled by the check valve 57. The piston 58 of the oil pump is connected to, or forms part of, a rod or plunger 60, extending upwardly parallel with the standards 2, beside the latter, and pivoted at its upper end to a pitman 61 connected to a crank 62 on a main operating shaft 63, supported in suitable bearings and provided in the present instance with the usual fast and loose belt pulleys 64, 65. The rod 60 also passes axially through a cylinder 70, suitable stuffing boxes 71 being provided at each end, and in said cylinder it is connected to a piston 72 employed for forcing air into the ironing tables.

In order that the movement of the press plunger may be controlled at all times by the operator and the proper coördination between the movement of the carrier for the ironing board and of the plunger accomplished, we provide means in the form of two pedals to be actuated by the operator, and an interlocking device so arranged and related that even an unskilled operator may operate the machine without danger to himself or to the apparatus.

Referring particularly to Figs. 2 and 3, 80 indicates a cross bar arranged beneath the stem of the inlet valve 56 of the hydraulic pump, said bar being guided by links 81 and connected at its ends to a yoke frame formed by the arms 82 connected to a head 83 on a link or rod 84, said link 84 being provided with elongated slots 85 and 86. Arranged in the slot 85 is a cross pin 87 secured to a lever 88 pivoted at 89 to the casting 37 and having at its opposite end a hollow weight 90 guided in its vertical movements by a guide 91 preferably formed on the lower end plate of the air pump cylinder 70. This lever 88 rests near its fulcrum upon a piston or plunger 92 having its lower end in the passage 46 leading from the hydraulic pump to the main cylinder. Operating in the slot 86 in the rod 84 is a pin 93 (Fig. 3) secured in the forked end of a lever 94 pivoted at 95 to the weighted rod 50, and pivotally connected near said pivot to a hanger 96, pivoted to the end of a lever 97 secured rigidly to a shaft 98 mounted in bearings 99 and extending longitudinally of the base of the machine, outside of the chamber therein, the shaft 98 being automatically movable in one direction under the influence of weight 51 to cause the approach of the support and platen. To one end of the shaft 98 is connected a crank 100 (Figs. 7 and 8) to which is pivoted a link 101, constituting with an arm 102, pivoted thereto, a toggle, said arm 102 being connected to or forming part of a lever 103, pivoted at 133 and provided on one side of its pivot with a stud 104, and on its inner side nearer the pivot, with a stud 105.

201 indicates a stop with which the link 101 coöperates when in the position shown in Fig. 8, holding the toggle extended and the lever 100 elevated.

106 indicates a treadle or starting lever pivoted at 107 and having the short rearwardly-extending portion slotted for the reception of the pin 105 on the lever 103, so that when said treadle is depressed and the parts moved from the position shown in Fig. 8 to that in Fig. 9, the toggle composed of the link 101 and arm 102 will be broken and the weight will cause the parts to be turned back to the position shown in said last mentioned Fig. 7. This lever 106 also has a longer rearward extension or arm 108 to which is connected a vertically-movable rod 30 guided in the main frame, and when moved upwardly adapted to coöperate with one of the apertures 31 formed in the flange 32 at the lower end of the bearing sleeve of the rotary carrier 6, as shown particularly in Figs. 1, 4 and 5, the relation of these parts being such that the treadle 106 cannot be depressed and the rod elevated until one of the apertures 31 is in line with the pin 30, and therefore an ironing board properly positioned beneath the heated platen, the flange and pin thus serving as an automatic interlocking device, preventing the improper operation of the plunger of the press, inasmuch as the downward movement of this treadle starts the plunger in its upward movement, as will be described. Arranged in proximity to the lever 106 is the carrier releasing treadle or lever 109, pivoted at 110, upon a suitable frame, and provided with an upwardly-extending arm 111, between which and a stationary projection 112 is arranged an adjustable spring 113, serving to maintain the lever 109 normally in the position shown in Fig. 10. This lever 109 is also provided at its inner side with a flange projecting over and engaging the pin 104 on the lever 103, so that when the treadle is depressed, the lever 103 and the toggle connected thereto, will be straightened or moved to the position shown in Fig. 8, with the link against the stop 201 and the plunger operating the ironing board will be allowed to descend.

115 indicates a lever pivoted upon the treadle or lever 109 at 116, and connected at its ends to links 117, which latter are in turn pivoted at 118 to stop blocks 119, guided for vertical movement in a frame 120, and having their upper surfaces rounded or inclined as shown in Fig. 10. The adjacent edges of the blocks 119 are recessed at 121 to form a socket for the reception of locking pins or projections 122 formed upon the lower side of the arms 6ª of the carrier 6 (see Fig. 1), and serving to lock the carrier in proper position with one or the other of the ironing boards in line with the platen. The locking heads or blocks 119 are supported upon a collar 123 resting upon a spring 124 supported upon the bracket 125, said collar 123 being guided upon a bolt 126 secured to the bracket 125 and projecting upwardly into the lower end of the recess 121 in the adjacent walls of the blocks 119. The spring 113 is stronger than the spring 124 and the lever 109 is maintained in the position shown in Fig. 10, and the carrier locked from rotation by the engagement of one of its pins 122 with the blocks, but upon the depression of the lever 109 both the blocks 119 are moved downward permitting the carrier 6 to be rotated in either direction, and when said lever is released again, the blocks will return to normal position and when the carrier is rotated to bring one of the studs 122 into engagement with one of the blocks 119, it will by reason of the inclined surface, depress it against the tension of the spring 124 at the same time through the links and lever 115, raising the other block above the normal level so that it will constitute a stop against which the pin 122 will strike to insure the proper positioning of the carrier, then when said pin enters the socket, or passes off the block first engaged, it will be held in the socket by both jaws and rotary movement of the carrier prevented. The operation of the machine just described will now be readily understood.

When adapted for operation, the platen 5 is heated by steam or by gas burners if desired, in the usual or any preferred manner and power being applied to the shaft 63, the rod to which the pistons of the air and liquid pumps is reciprocated, the former forcing air through the ironing board or work supports in the manner described, or if desired, withdrawing it therefrom. Although the plunger of the liquid pump is operating continuously, the liquid is not forced into the cylinder 36, excepting when the piston and ironing board are to be elevated, because the cross bar 80 is held elevated, raising the inlet valve 56 and opening free communication between the pump cylinder and the fluid receptacle 38. This valve 56 is held open by reason of the elevation of the yoke frame comprising members 82—84, connected to the lever 94, the arm 97 being elevated; the shaft 98 rotated and held by the toggle comprising members 101—102, the treadle 109 having been depressed and released, allowing the stop blocks 119 to be moved upwardly by their spring and engaging the locking pin 122 on the carrier 6. When, now it is desired to elevate the piston 35 and the ironing board which is above it and in line with the platen, the operator moves the treadle 106 to the position shown in Fig. 7, thereby breaking the toggle 101, 102 as shown in said figure, and the weight 51 causing the shaft 98 to rotate, dropping the lever 94 and permitting the valve 56 to close at each downward stroke of the pump plunger, but to open at each upward stroke, causing the liquid to rise and pass the valve 57 and enter the passage 46, thence acting on the small piston 44 to quickly raise the latter until the passage 45 is open and the liquid can pass directly under the main piston 35, causing the latter and the work support to be raised more slowly and with greater power by hydraulic pressure. As the lever 106 is connected to the rod 30, and the upper end of the latter is beneath the flange 32 on the carrier, it will be seen that said starting treadle cannot be moved until the aperture 31 is in line with said rod thereby insuring the proper positioning of the carrier and ironing board, before the piston 35 can be moved. When the garment is seated against the iron and the desired pressure has been obtained, the plunger 92 of the pressure regulator in the passage 46 will be raised lifting the lever 88 and causing the pin 87 therein to engage the rod 84 of the yoke, lifting again the valve 56 (which then serves as a pump relief valve) and holding it open so that no more fluid will be supplied to the main piston. This lifting of the yoke does not operate the lever 94 by reason of the loose connection between the pin 93 and the slot 86, so that the desired pressure will be maintained between the work and the iron for any desired length of time, and the amount of the pressure may be increased or diminished by the insertion or removal of small weights from the larger weight 90 connected to the lever 88.

When the pressing operation is finished, the operator presses upon the treadle 109, and through the pin 104 and lever 103, straightens the toggle again, turning the shaft 98, raising the arm 97 and the lever 94, and also the weighted rod 50 which controls the exit passage from the cylinder 36. When the rod 50 is first lifted, it uncovers the small exit port 53, releasing the pressure in the passage 46, and its further upward movement lifts the relief valve 48, allowing the liquid under the piston 35 to pass back into the receptacle 38, and said piston 35 and the work support thereon to return to lowermost position. When the lever 94 is lifted in the manner described and held by the toggle, the valve 56 is also held open, and the parts are then in position ready for the rotation of the carrier to bring another work support between the iron and the plunger.

From the above it will be seen that the device is relatively simple in construction, and is capable of operation by an unskilled operator, the only things necessary for him to accomplish being the proper manipulation of the two treadles, the application of the garment from one ironing board while it is away from the heated platen, and the rotation of the carrier, the interlocking of the parts being such that there is no possibility of improper operation and resulting damage to the machine. It will be understood that the pressure exerted between the garment and the iron is uniform irrespective of wear of the parts, and therefore this pressure may be regulated to suit the work by the person in charge of the machine adding to or removing weights from the lever 88 to produce that best adapted for the work.

What is claimed is—

1. In an ironing machine, the combination with a heated pressing platen and a work support relatively movable toward and from each other, of a fluid reservoir, a constantly operating fluid pressure mechanism for causing the parts to move toward each other, said mechanism being located in the reservoir and comprising an automatically operated relief valve discharging into the reservoir when the fluid pressure reaches a predetermined point.

2. In an ironing machine, the combination with a heated pressing platen and a work support relatively movable toward and from each other, of a fluid reservoir, a hydraulic mechanism for causing said relative movement comprising a pump, a cylinder and a chambered member, forming an operative connection between the pump and cylinder located in said reservoir and provided with a pressure relief valve discharging into the reservoir.

3. In an ironing machine, the combination with a heated pressing platen and a work support relatively movable toward and from each other, of a fluid reservoir, a hydraulic mechanism for causing said relative movement comprising a pump and pressure cylinder connected together and disposed in the reservoir and adapted to obtain the liquid from and discharge it into said reservoir.

4. In an ironing machine, the combination with a heated pressing platen and a work support relatively movable toward each other, of a hydraulic cylinder, a plunger therein operating upon the parts, a fluid reservoir, a pump embodying a piston and a fluid chamber and a passage connecting it to the cylinder, inlet and outlet valves respectively controlling the flow of fluid from the reservoir to the pump chamber and from the latter to the cylinder passage, a movable plunger actuated by the liquid in the passage and connected to the pump inlet valve to open the latter when the pressure in the cylinder and passage exceeds a predetermined amount.

5. In an ironing machine, the combination with a heated platen and a work support relatively movable toward each other, of a hydraulic cylinder, a plunger therein operating upon the parts, a pump supplying liquid to the cylinder, a relief valve for the cylinder operated when the pressure therein reaches a predetermined amount, a relief valve for the pump and a controlling member coöperating with both valves to arrest the passage of fluid from the pump to the cylinder to limit the pressure exerted between the platen and work support.

6. In an ironing machine, the combination with a heated platen and a work support relatively movable toward each other, of a hydraulic cylinder, a plunger therein operating upon the parts, a liquid reservoir, a pump supplying liquid therefrom to the cylinder, a relief valve for the cylinder, a relief valve for the pump, a controlling member for said valves adapted to be operated when the pressure exerted between the platen and work support reaches a predetermined amount and connections between said member and the valves for causing the opening of the pump relief prior to, and closing it after the cylinder relief valve when said member is operated in opposite directions.

7. In an ironing machine, the combination with a heated platen and a work support relatively movable toward each other, of a hydraulic cylinder, a plunger therein operating upon the parts, a liquid reservoir, a pump for supplying liquid to the cylinder comprising a pump chamber connected to said cylinder, a weighted relief valve controlling communication from the cylinder to the reservoir, a relief valve controlling communication from the reservoir to the pump chamber and a lever connecting said valves, an operating member pivoted to the lever and means for holding the member with the valves open.

8. In an ironing machine, the combination with a heated platen and a work support relatively movable toward each other, of a hydraulic cylinder, a plunger therein operating upon the parts, a liquid reservoir, a pump for supplying liquid to the cylinder comprising a pump chamber connected to said cylinder, a relief valve controlling communication from the cylinder to the reservoir, a relief valve for the pump chamber, connections between said valves and an operating member for actuating them, a regulator operated by the pressure of liquid supplied to the cylinder for opening the pump relief valve independently of the cylinder relief valve when the pressure exceeds a predetermined amount.

9. In an ironing machine, the combination with a heated platen and a work support relatively movable toward each other, of a hydraulic cylinder, a plunger therein operating upon the parts, a liquid reservoir, a pump comprising a chamber connected to the cylinder, inlet and outlet valves controlling the admission of liquid from the reservoir into the chamber and its passage therefrom to the cylinder, a relief valve for the cylinder, a lever connected to the cylinder relief valve and having a loose connection with the pump inlet valve, an operating member connected to said lever to open both said valves, and a regulator operated by the pressure of the liquid supplied to the cylinder adapted to open the inlet valve independently of the operating member.

10. In an ironing machine, the combination with the relatively movable platen and work support, a cylinder and a plunger therein, of a liquid reservoir, a supply pump comprising a chamber communicating with the reservoir and cylinder having inlet and outlet valves controlling the admission of fluid into the chamber and its passage to the cylinder, a cylinder relief valve and the weight coöperating therewith, a lever pivoted to the weight and loose connections between said lever and inlet valve, an operating member pivoted to the lever and devices for locking said member in operated position to hold both valves open.

11. In an ironing machine, the combination with a main frame, a platen thereon, a pressing cylinder and piston and a hollow work support adapted to be inserted between the platen and piston, of a liquid pump cylinder and passages between it and the pressing cylinder, an air pump cylinder and passages between it and the interior of the work support and connected pistons operating in the liquid and air pump cylinders.

12. In an organized ironing machine, the combination with a heated platen, a hydraulic cylinder and a piston therein located beneath the platen, of a laterally movable carrier, a vertically movable work support, a supporting post beneath the work support guided on the carrier in alinement with the piston and adapted to be moved with the carrier to and from a position between said piston and platen, a pump for supplying fluid pressure to the cylinder and valve mechanism for controlling the supply and exhaust of fluid to and from said cylinder.

13. In an organized ironing machine, the combination with a heated platen, a hydraulic cylinder and a piston therein arranged beneath the platen, of a laterally movable carrier, a work support thereon movable vertically on the carrier and adapted to be moved by the carrier into and away from a position between the piston and platen, a continuously operating pump for supplying fluid under pressure to the cylinder, valve mechanism for controlling the supply and exhaust to the cylinder and an automatic regulator actuated by the pressure of fluid in the cylinder for arresting the movement of the piston during the operation of the pump without decreasing the pressure between the work support and platen.

14. In an organized ironing machine, the combination with a heated platen, a hydraulic cylinder and piston therein, of a laterally vertically movable work support adapted to be inserted between the piston and platen and provided with apertures in its surface, an air passage leading thereto, a continuously operating liquid pump for supplying liquid to the cylinder, an air pump connected thereto for supplying air to the work support and mechanism between the liquid pump and cylinder for arresting the movements of the piston independently of the operation of the liquid and air pumps.

15. In an ironing machine, the combination with the main frame having an air chamber and the platen on the frame, of a carrier rotatively mounted on the frame and having a central air chamber communicating with that of the frame, a plurality of independently movable hollow work supports on a carrier having their faces provided with air outlet perforations, flexible air pipes between the supports and the central air chamber of the carrier and a pump supplying air under pressure to the chamber in the frame.

16. In an ironing machine the combination with a platen, a work support and mechanism for moving them relatively toward and from each other, of a controlling means for said mechanism embodying a part automatically movable in one direction to cause the approach of the support and platen, a toggle for retaining said part from movement and members under the control of the operator for straightening and breaking said toggle.

ARTHUR T. HAGEN.
GEORGE B. CAUDLE,
*Executor of the estate of Daniel M. Cooper, deceased.*

Witnesses to the signature of Arthur T. Hagen:
CHARLES PUTNAM,
RUSSELL B. GRIFFITH.

Witnesses to the signature of George B. Caudle:
RUSSELL B. GRIFFITH,
NELSON H. COPP.